United States Patent

[11] 3,609,456

[72] Inventors Masao Kayaguchi;
 Yuji Ikuno, both of Tokyo, Japan
[21] Appl. No. 35,974
[22] Filed May 11, 1970
[45] Patented Sept. 28, 1971
[73] Assignee Olympus Optical, Ltd.
 Shibuya-ku, Tokyo, Japan
[32] Priority May 14, 1969
[33] Japan
[31] 44/37130

[54] ELECTRIC CIRCUIT FOR PREVENTING THE BURNING OF AN ELECTRIC MOTOR
 4 Claims, 4 Drawing Figs.
[52] U.S. Cl. ................................................ 317/13 R,
 95/31 AC, 242/71, 322/39
[51] Int. Cl. ............................................... H02h 7/08
[50] Field of Search............................................ 317/13 R,
 13 A, 31, 36 TD; 322/12, 39; 242/71; 95/31 AC

[56] References Cited
 UNITED STATES PATENTS
 3,175,124 3/1965 Russell, Jr. .................. 317/13
 3,332,007 7/1967 Livengood et al. ............ 317/13 X
 3,413,520 11/1968 Westbrook.................... 317/13 X

*Primary Examiner*—Gerald Goldberg
*Attorney*—Otto John Munz

ABSTRACT: Electric circuit for preventing the burning of an electric motor energized by an electric source through the electric circuit. The electric circuit has a memory circuit actuated by a setting input pulse and reset by a resetting input pulse, a timing circuit connected to said memory circuit so as to be actuated thereby when the same is actuated while the timing circuit is rendered to be inoperative when the memory circuit is reset or a resetting input pulse is applied to the timing circuit, a relay connected to the timing circuit so as to be energized when the same is actuated, and a switch operatively coupled with the relay so as to energize the motor when the relay is energized while the motor is deenergized by the switch when the relay is deenergized, thereby permitting the motor to continue to be driven upon application of the setting input pulse to the memory circuit until the resetting input pulse is applied thereto. The timing circuit comprises a monostable multivibrator having a predetermined holding time which is selected to be suitable for preventing the burning of the motor under the overloaded condition. Thus, the motor is automatically deenergized after the energization thereof by virtue of the holding time before the resetting input pulse is applied to the memory circuit under the overloaded condition of the motor, while the reenergization of the motor by applying a further setting input pulse to the memory circuit is prevented until a resetting input pulse is applied to the memory circuit prior to the application of the further setting input pulse thereto.

INVENTORS
MASAO KAYAGUCHI, YUJI IKUNO

ATTORNEY

ELECTRIC CIRCUIT FOR PREVENTING THE BURNING OF AN ELECTRIC MOTOR

BACKGROUND OF THE INVENTION

The present invention relates to an electric circuit having a memory circuit for preventing the burning of an electric motor under the accidental overloaded condition.

In the prior art electric circuit having a memory circuit in which a motor in the circuit is energized when the memory circuit is set or actuated by the application of an input pulse thereto while the motor is deenergized when a further input pulse is applied to the memory circuit so as to reset the same, the motor might be subjected to the overloaded condition causing the burning thereof when the rotation of the motor is prevented under some accidental circumstances, because excessive current flows through the motor until a resetting input pulse is applied to the memory circuit.

The present invention aims at avoiding the above described disadvantages of the prior art electric circuit.

SUMMARY OF THE INVENTION

An object of the present invention is to provide a novel and useful electric circuit for preventing the burning of an electric motor energized by an electric source through the electric circuit.

Another object of the invention is to provide a novel and useful electric circuit of the type described above in which the motor is automatically deenergized after a predetermining time after the motor is energized under the overloaded condition for some accidental circumstances and the reenergization of the motor is prevented until the accidental circumstances are removed.

The above objects are achieved in accordance with the present invention by an electric circuit having a memory circuit actuated by a setting input pulse applied thereto and reset by a resetting input pulse applied thereto, a timing circuit connected to the memory so as to be actuated thereby when the same is actuated while the timing circuit is rendered to be inoperative when the memory circuit is reset or a resetting input pulse is applied to the timing circuit, a relay connected to the timing circuit as to be energized thereby when the same is actuated, and a switch operatively coupled with the relay as to energize the motor when the relay is energized while the motor is deenergized by the switch when the relay is deenergized, thereby permitting the motor to continue to be driven upon application of the setting input pulse to the memory circuit until the resetting input pulse is applied thereto, said timing circuit being comprised of a monostable multivibrator having a predetermined holding time to automatically reset the same after expiration of the holding time, the holding time being selected to be suitable for preventing the burning of the motor under the overloaded condition thereof, thereby permitting the motor to be automatically deenergized after the energization thereof by virtue of the holding time even before the resetting input pulse is applied to the memory circuit under the overloaded condition of the motor, while the reenergization of the motor by applying a further setting input pulse to the memory circuit is prevented until a resetting input pulse is applied to the memory circuit prior to the application of the further setting input pulse thereto.

The electric circuit of the present invention is applicable to an electric device such as an automatic film take up device incorporated in a photographic camera. In this case, the setting input pulse is generated by the medium of synchronizing contacts of the camera and the resetting input pulse is supplied to the memory circuit through a switch actuated by a cam integral with a shaft having film-feeding sprockets.

DETAILED DESCRIPTION OF THE PREFERRED EMBODIMENT

Figure 1:
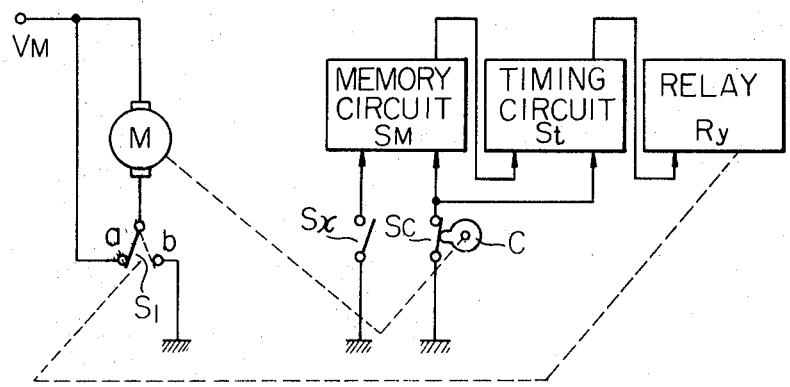
FIG. 1 is a block diagram showing the principle of the present invention.

Referring to FIG. 1, the electric circuit of the present invention comprises a memory circuit $S_M$ constructed by a flip-flop circuit, a timing circuit $S_t$ constructed by a monostable multivibrator and connected to the memory circuit $S_M$ so as to be actuated thereby when the memory circuit $S_M$ is actuated, a relay $R_y$ connected to the timing circuit $S_t$ so as to be energized thereby when the same is actuated. A normally opened switch $S_x$ is connected to the input of the memory circuit $S_M$ so that the setting input pulse is supplied to the memory circuit $S_M$ by differentiating the variation in the voltage taking place when the switch $S_x$ is once closed and opened thereby actuating the memory circuit $S_M$. Another normally opened switch $S_c$ is connected to the outer input of the memory circuit $S_M$ and the switch $S_c$ is normally closed by a cam C operatively coupled with a motor M energized by an electric source through the electric circuit shown in FIG. 1. When the motor M is driven, the cam C is rotated and the switch $S_c$ is opened and, after about one complete rotation of the cam C, the switch is again closed by the cam C, so that a resetting input pulse is applied to the memory circuit $S_M$ by differentiating the variation in the voltage taking place when the switch $S_c$ is closed after the rotation of the cam C thereby resetting the memory circuit $S_M$.

The relay $R_y$ is so connected to a switch $S_1$ that the same is switched to connect contact b when the relay $R_y$ is energized while the switch $S_1$ is switched to connect contact a when the relay $R_y$ is deenergized. As shown in FIG. 1, the motor M is so connected to the electric source through the switch $S_1$ that, when the switch $S_1$ is switched to contact b, the voltage $V_M$ is applied to the terminals of the motor M so that the same is energized, while both the terminals of the motor M are short circuited to apply the electromagnetic braking force to the motor M when the switch $S_1$ is switched to contact a.

As is well known, a monostable multivibrator has a holding time automatically resetting the same after a time period after the monostable multivibrator has been set by the application of a setting input pulse thereto. The monostable multivibrator is also reset any time when a resetting input pulse is applied after it has been set by the application of a setting input pulse thereto.

In accordance with the present invention, the holding time of the timing circuit $S_t$ constructed by a monostable multivibrator is so selected that the burning of the motor M is prevented even though excessive current flows in the motor M due to the overloaded condition thereof under some accidental circumstances by the automatic deenergization of the motor M after the expiration of the holding time.

Figure 2:
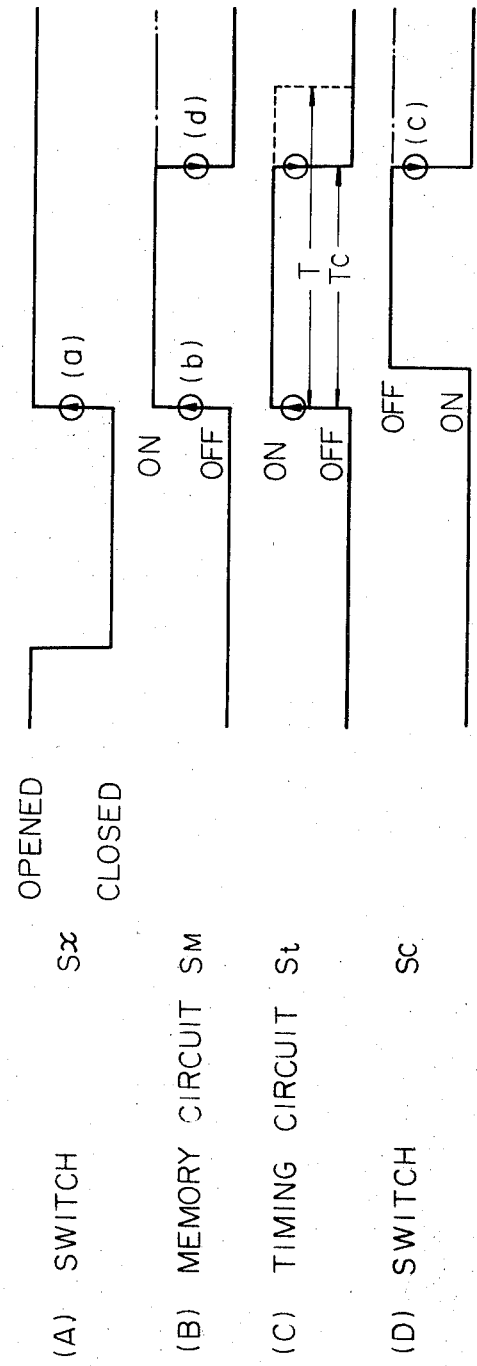
FIG. 2 is a diagram showing the waveforms of the outputs of various elements of the electric circuit of the present invention.

In the normal operation of the above described electric circuit, the switch $S_x$ is first closed and opened again so that the variation in the voltage as shown by (A) in FIG. 2 appears at both the terminals of the switch $S_x$. The present invention utilizes the rise (a) of the waveform of the voltage shown by (A) is FIg. 2 so as to generate a setting pulse to be supplied to the memory circuit $S_M$ by differentiating the rise (a) of the wave form so that the same is set for the actuation. The memory circuit $S_M$ thus stores the information that the switch $S_x$ is opened after it has been closed. The waveform of the output of the memory circuit $S_M$ stores the application of the setting input pulse, the rise (b) of the waveform of the output of the memory circuit $S_M$ is utilized as an input to be supplied to the timing circuit $S_t$ so that the same is actuated. Thus, the timing circuit $S_t$ generates an output having the wave form shown by (c) in FIG. 2 similar to that of the memory circuit $S_M$. When the timing contact $S_t$ is actuated, current flows in the relay $R_y$ so that the switch $S_1$ is switched to connect contact $b$ thereby energizing the motor M by the voltage $V_M$ of the electric source. As the motor M is driven, the cam C is rotated to open the normally opened switch $S_c$ and again closed when the cam C rotates about one complete revolution. The waveform of the voltage appearing at the terminals of the switch $S_c$ during the operation thereof is shown by (D) in FIG. 2. The present invention utilizes the descent (C) of the waveform shown by (D) in FIG. 2 as to generate a resetting pulse to be applied to the memory circuit $S_M$ by differentiating the descent (C) of the waveform (D), thereby permitting the memory circuit $S_M$ to reset so that the output indicating the storage of the information therein is distinguished as shown by the descent (d) in FIG. 2. The timing circuit $S_t$ is supplied with a pulse generated by differentiating the descent (d) of the waveform (B) so that the timing circuit $S_t$ is reset or is made inoperative thereby deenergizing the relay $R_y$ to switch the switch $S_1$ so as to connect the contact $a$. Thus, the motor M is deenergized and immediately stopped by the electromagnetic braking force by virtue of the short circuiting of the terminals of the motor M. Thus, the motor M is driven by the application of a setting input pulse to the memory circuit through the switch $S_x$ and automatically stopped after a predetermined time or a predetermined number of revolution of the motor M corresponding to one revolution of the cam C by the application of a resetting input pulse to the memory circuit $S_M$ through the switch $S_c$ actuated by the cam C which is coupled with the motor M.

Alternatively, the resetting input pulse applied to the memory circuit $S_M$ may be supplied simultaneously to the timing circuit instead of applying the above described pulse generated by differentiating the descent (d) of the waveform (B) so as to reset the timing circuit $S_t$.

In the prior art electric circuit of the type described above, if the motor M is prevented its rotation under some accidental circumstances during the driving of the motor M, excessive current flows in the motor M so that the motor M might be burned, because no resetting input pulse is applied to the memory circuit $S_M$ due to the fact that the cam C is not rotated and the switch $S_c$ is not actuated by the cam C to close the same.

In accordance with the present invention, however, the current flowing through the motor M is automatically stopped after the expiration of the holding time of the timing circuit $S_t$ even though the motor M is subjected to the overloaded condition for some accidental circumstances and no resetting input pulse is applied to the memory circuit $S_M$. In other words, the timing circuit $S_t$ constructed by a monostable multivibrator is automatically reset after the expiration of the holding time after the same has been set so that the relay $R_y$ is deenergized to deenergize the motor M thereby positively preventing the burning of the motor M.

In accordance with a further feature of the present invention, since the cam C does not rotate to close the switch $S_c$ after the same is opened by the cam C when the rotation of the motor M is prevented during the operation for some accidental circumstances, the descent (C) of the waveform (D) in FIG. 2 does not appear, so that no resetting pulse is applied to either of the memory circuit $S_M$ and the timing circuit $S_t$ thereby keeping the memory circuit $S_M$ in its actuated or set state as indicated by the one-dot chain line in the waveform (B) in FIG. 2 while the timing circuit $S_t$ is automatically reset after the holding time T thereof as indicated by the broken line in the waveform (C) in FIG. 2 thereby deenergizing the relay $R_1$ to deenergize the motor M even though no resetting pulse is applied to reset the timing circuit $S_t$ which would have been applied if the resetting pulse were supplied to the memory circuit $S_M$. Therefore, a further setting pulse can not be applied to the memory circuit $S_M$, unless it is reset prior to the application of the further setting pulse thereto. This means that the cam c must be rotated one complete revolution together with the predetermined number of rotation of the motor M after the accidental circumstances are removed to enable the motor M to be driven in the normal condition. This insures the motor M against any damage due to the overloaded condition thereof for any accidental circumstances.

Figure 3:
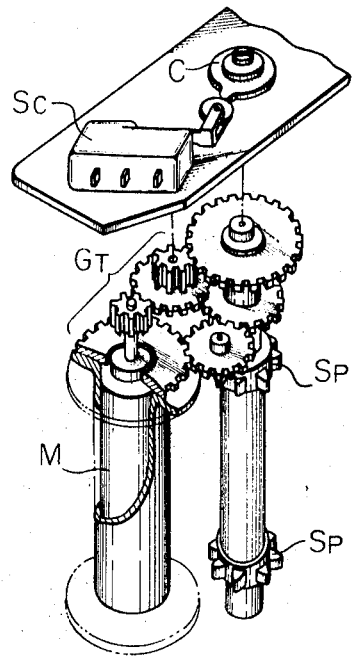
FIG. 3 is a fragmentary perspective view showing an example of the arrangement of the cam and the switch provided in an automatic film takeup device of a photographic camera in accordance with the present invention for supplying the resetting input pulse to the memory circuit.

FIG. 3 shows an embodiment of the present invention is applied to an automatic film takeup device of a photographic camera. In this case, the synchronizing contacts of the camera are utilized as the switch $S_x$. As is well know, the synchronizing contacts are normally opened and are closed and opened again in response to the operation of the shutter of the camera upon actuation of the releasing means of the camera. The cam C is fixedly secured to a shaft having film feeding sprockets $S_p$ and driven by the motor M through a gear train $G_r$ so that the cam C is rotated a complete revolution each time the film is taken up by one frame by the sprockets after the exposure thereof. The normally opened switch $S_c$ is so located in the base plate of the camera that the same is held in its closed condition by the cam C at the beginning of the operation of the camera, and, when the film is fed after the exposure thereof, the switch $S_c$ is opened and closed again at the end of one revolution of the cam C to be ready for the next operation.

In normal condition, the film is fed by one frame after the exposure thereof while the electric circuit operates in the manner as previously described.

When some accidental circumstances take place and the rotation of the motor M is prevented during the operation thereof so that the motor M is subjected to the overloaded condition, the timing circuit $S_t$ is automatically reset after the holding time T thereof without awaiting the application of a resetting pulse thereto so that the motor M is deenergized to prevent the motor M from being burned, while the memory circuit $S_M$ is left in its set condition to prevent a further setting input pulse from being applied thereto unless the accidental circumstances are removed and the cam C rotated to its initial position to reset the memory circuit $S_M$.

Figure 4:
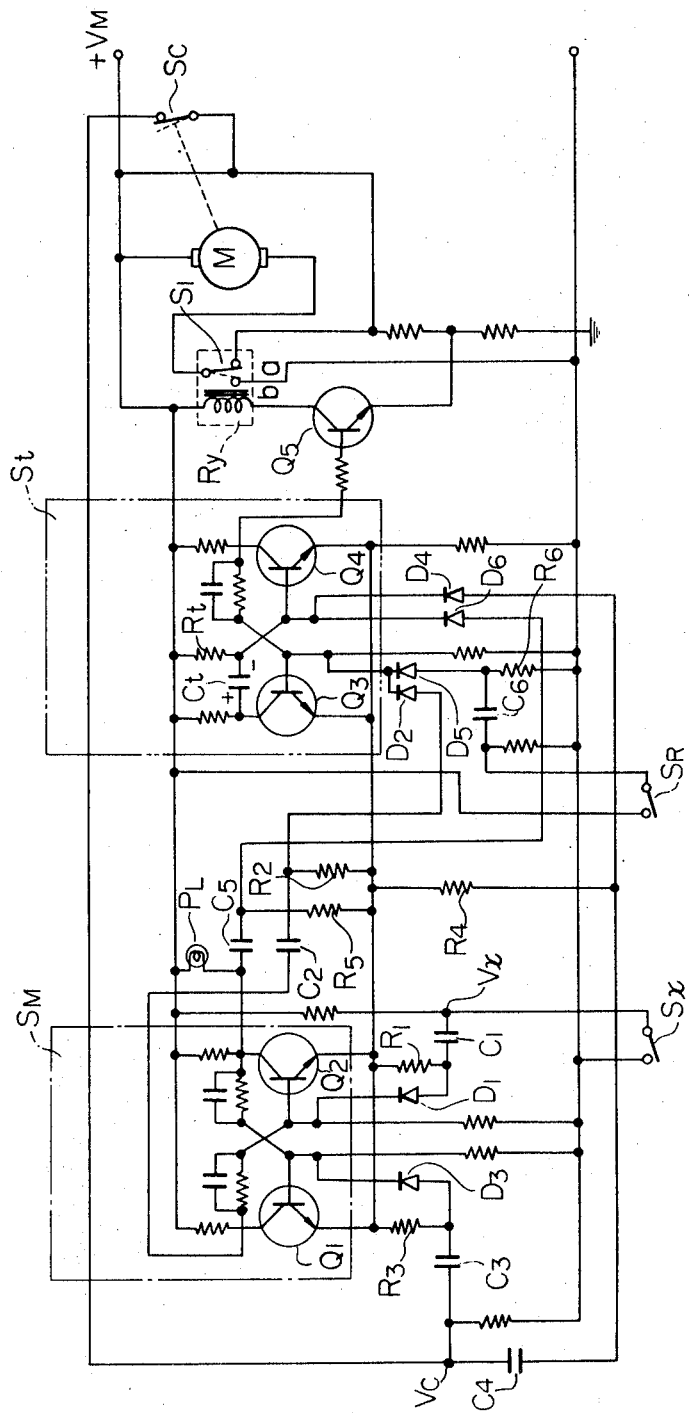
FIG. 4 is a diagram showing an embodiment of the electric circuit of the present invention.

FIG. 4 shows an embodiment of the electric circuit incorporated in the camera shown in FIG. 3. The portion surrounded by one-dot chain line represents the memory circuit $S_M$ while the portion surrounded by $Q_1$, chain line represents the timing circuit $S_t$, the relay $R_y$ being indicated by the broken line.

The memory circuit $S_M$ comprises a flip-flop circuit having transistors $Q_1$, $Q_2$ connected as shown. The timing circuit $S_t$ comprises a monostable multivibrator having transistors $Q_3$, $Q_4$ connected as shown.

Capacitor $C_1$ and resistor $R_1$ are so connected to the switch $S_x$ so as to constitute a differential circuit for supplying a pulse to the base of the transistor $Q_2$ through diode $D_1$ when the switch $S_x$ is switched from ON condition to OFF condition. Capacitor $C_2$ and resistor $R_2$ are so connected to the collector of the transistor $Q_1$ so as to constitute a differential circuit supplying a pulse to the base of the transistor $Q_3$ of the timing circuit $S_t$ through diode $D_2$ when the transistor $Q_1$ is rendered to be in OFF condition from ON condition. The holding time T is selected by suitably determining the characteristics of capacitor $C_t$ and resistor $R_t$.

Capacitor $C_3$ and resistor $R_3$ are so connected to the switch $S_c$ that they constitute a differential circuit to apply a pulse to the base of the transistor $Q_1$ through diode $D_3$ when the switch $S_c$ is opened, while capacitor $C_4$ and resistor $R_4$ are so connected to the switch $S_c$ that they constitute a differential circuit for applying a pulse to the base of the transistor $Q_4$ through diode $D_4$ when the switch $S_c$ is closed.

A transistor $Q_5$ is connected in series to the relay $R_y$ with the base thereof connected to the collector of the transistor $Q_4$ of the timing circuit $S_t$ A pilot lamp $P_L$ is connected to the collector of the transistor $Q_2$ so that the abnormally overloaded condition of the motor M is indicated by the lamp $P_L$ when it is not lightened and extinguished.

Capacitor $C_5$ and resistor $R_5$ connected to the collector and the emitter of the transistor $Q_2$ constitute a differential circuit for applying a resetting pulse to the base of the transistor $Q_4$ through diode $D_6$ from the memory circuit $S_M$ when the $S_M$ is reset. The resetting pulse is used with the resetting pulse supplied directly from the differential circuit constituted by the capacitor $C_4$ and the resistor $R_4$ through the diode $D_4$.

A resetting switch $S_r$, a capacitor $C_6$ and a resistor $R_6$ are provided in the electric circuit of the present invention in order to reset the memory circuit $S_M$ after the accidental circumstances are removed. The capacitor $C_6$ and the resistor $R_6$ constitutes a differential circuit for supplying a pulse to the base of the transistor $Q_3$ through diode $D_5$ when the switch $S_r$ is closed as to actuate the timing circuit $S_t$ or render the transistor $Q_4$ to be nonconductive, thereby rendering the transistor $Q_5$ to be conductive to energize the relay $R_y$. Thus, the motor M is driven to rotate the cam C to its initial position at which position the switch $S_c$ is closed and a resetting pulse is applied to the memory circuit $S_M$ so that all the elements are reset to its initial condition.

In normal operation of the electric circuit described above starting with the transistor $Q_1$ in ON condition while the transistor $Q_2$ is in OFF condition, when the switch $S_x$ is operated to be switched from ON to OFF condition, the voltage $V_x$ appearing at the terminal of higher voltage is made $V_M$ of the electric source from zero voltage, thereby supplying a setting input pulse generated by the differential circuit $C_1$, $R_1$ to the base of the transistor $Q_2$ through the diode $D_1$ so that the transistor $Q_2$ is made ON while the transistor $Q_1$ is rendered to be OFF to store the information to drive the motor M. When the transistor $Q_1$ is made OFF condition, a pulse generated by the differential circuit $C_2$, $R_2$, is applied to the base of the transistor $Q_3$ of the timing circuit $S_t$ through the diode $D_2$, so that the transistor $Q_3$ is rendered to be ON thereby permitting the negative charge stored in the capacitor $C_t$ to be supplied to the base of the transistor $Q_4$ to render the same to be OFF. The transistor $Q_4$ is kept in OFF condition until the holding time T expires unless a resetting pulse is applied thereto prior to the expiration if the holding time T. When the transistor $Q_4$ is made OFF, the transistor $Q_5$ is rendered to be ON so that the relay $R_y$ is energized to drive the motor M. After the one complete revolution the cam C effected by the rotation of the motor M which causes the film to be taken up by one frame, the switch $S_c$ is switched from OFF condition to ON condition, so that the voltage $V_c$ at the terminal of the switch $S_c$ is made from zero to $V_M$ thereby permitting a pulse generated by the differential circuit $C_4$, $R_4$ to be applied to the base of the transistor $Q_4$ through the diode $D_4$ so as to discharge the electric charge stored in the capacitor $C_t$, thus rendering the voltage at the base of the transistor $Q_4$ to be positive. Therefore, the transistor $Q_4$ is made ON. At the same time, the transistors $Q_3$ and $Q_5$ are made OFF, so that the relay $R_y$ is deenergized to stop the driving of the motor M. The voltage $V_c$ at the terminal of the switch $S_c$ is differentiated by the differential circuit $C_3$, $R_3$ and a pulse generated thereby is applied to the base of the transistor $Q_1$ through the diode $D_3$ thereby rendering the transistor $Q_1$ to be ON condition while the transistor $Q_2$ is made OFF so that the memory circuit $S_M$ is reset to extinguish the information stored therein.

If abnormally overloaded condition of the motor M takes place during the operation due to some accidental circumstances, the rotation of the cam C is prevented so that the switch $S_c$ is not switched from OFF to ON so as to deenergize the motor M. However, the timing relay St is automatically reset after the expiration of the holding time T while the memory circuit $S_M$ is kept in its set position because the electric charge stored in the capacitor $C_t$ is discharged through the resistor $R_t$ thereby rendering the transistor $Q_4$ to be ON after the expiration of the holding time T, i.e., the time constant determined by the characteristics of the capacitor $C_t$ and the resistor $R_t$. Thus, the transistor $Q_5$ is made OFF so that the relay $R_y$ is deenergized to deenergize the motor M. Since the memory circuit $S_M$ is kept in its set condition with the transistor $Q_1$ being kept in OFF condition while the transistor $Q_2$ is kept in ON condition, the pilot lamp $P_L$ indicates this condition and no further setting pulse can not be supplied to the memory circuit $S_M$ unless the same is reset by rotating the cam C to its initial position after the accidental circumstances are removed.

In order to reset the memory circuit $S_M$ after the hindrance preventing the rotation of the motor M is removed, the resetting switch $S_R$ is closed. When the switch $S_R$ is closed, the voltage appearing at the terminal of the switch $S_R$ is differentiated by the differential circuit $C_6$, $R_6$ and a pulse generated thereby is applied to the base of the transistor $Q_3$ through the diode $D_5$ so that the transistor $Q_3$ is made ON while the transistor $Q_4$ is made OFF, thus rendering the transistor $Q_5$ to be ON so as to energize the relay $R_y$. Therefore, the motor M is driven to rotate the cam C to its initial position at which position the switch $S_c$ is made ON to reset the memory circuit $S_M$ and the timing circuit $S_t$ so as to be ready for the next operation.

In accordance with the present invention, since the timing circuit is constructed by an electronic circuit, the space required for the arrangement of the electric circuit is made to the minimum while the damage to the motor is positively prevented.

We claim:

1. In an electric circuit for preventing the burning of an electric motor energized by an electric source through said electric circuit, said electric circuit having a memory circuit actuated by a setting input pulse applied thereto and reset by a resetting input pulse applied thereto, a timing circuit connected to said memory circuit so as to be actuated thereby when the same is actuated while said timing circuit is rendered to be inoperative when said memory circuit is reset or resetting input pulse is applied to said timing circuit, a relay connected to said timing circuit so as to be energized thereby when the same is actuated, and a switch operatively coupled with said relay so as to energize said motor when said relay is energized while said motor is deenergized by said switch when said relay is deenergized, thereby permitting said motor to continue to be driven upon application of said setting input pulse to said memory circuit until said resetting input pulse is applied thereto, the improvement wherein said timing circuit comprises a monostable multivibrator having a predetermined holding time to automatically reset the same after expiration of said holding time, said holding time being selected to be suitable for preventing the burning of said motor under the overloaded condition thereof, thereby permitting said motor to be automatically deenergized after the energization thereof by virtue of said holding time even before said resetting input pulse is applied to said memory circuit under the overloaded condition of said motor, while the reenergization of said motor by applying a further setting input pulse to said memory circuit prior to the application of said further input pulse thereto.

2. Electric circuit according to claim 1, wherein said resetting input pulse is generated by the medium of a cam operatively coupled with said motor and capable of actuating a switch in cooperation therewith so that said motor is stopped automatically after the predetermined rotation there of under the normally loaded condition.

3. Electric circuit according to claim 1, wherein said switch is so connected to said motor that both the terminals of said motor are short circuited by said switch when said relay is deenergized thereby applying electromagnetic braking force to said motor.

4. Electric circuit according to claim 2 which is incorporated in an automatic film takeup device of a photographic camera, wherein said cam is fixedly secured to a shaft of film takeup sprockets driven by said motor by one revolution at a time through a gear train for taking up the film by one frame and said setting input pulse is generated by the medium of synchronizing contacts of said camera.

75